(12) United States Patent
Haskett

(10) Patent No.: US 7,466,402 B2
(45) Date of Patent: Dec. 16, 2008

(54) SYSTEM AND METHOD FOR TESTING A LIGHTING DIODE

(75) Inventor: Bradley M. Haskett, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 178 days.

(21) Appl. No.: 11/641,930

(22) Filed: Dec. 18, 2006

(65) Prior Publication Data

US 2008/0144021 A1 Jun. 19, 2008

(51) Int. Cl.
*G01J 1/00* (2006.01)
*G01J 1/42* (2006.01)

(52) U.S. Cl. ...................... 356/213; 356/218
(58) Field of Classification Search ............ None
See application file for complete search history.

(56) References Cited

U.S. PATENT DOCUMENTS

| 4,750,086 | A | 6/1988 | Mittal |
| 4,967,832 | A | 11/1990 | Porter |
| 5,088,006 | A | 2/1992 | del Puerto et al. |
| 2005/0094397 | A1* | 5/2005 | Yamada et al. ............... 362/253 |
| 2005/0189554 | A1* | 9/2005 | Dry ............................. 257/96 |
| 2007/0139938 | A1* | 6/2007 | Petroski et al. ............. 362/373 |

* cited by examiner

*Primary Examiner*—Michael P Stafira
(74) *Attorney, Agent, or Firm*—Wade J. Brady, III; Frederick J. Telecky, Jr.

(57) ABSTRACT

A system for testing a lighting diode includes one or more nozzles, a probe, and a detector, where the lighting diode is operable to emit light in response to a current. The one or more nozzles direct a cooling fluid towards the lighting diode. The probe applies a current to the lighting diode. The detector detects the light emitted by the lighting diode in response to the current.

20 Claims, 1 Drawing Sheet

SYSTEM AND METHOD FOR TESTING A LIGHTING DIODE

TECHNICAL FIELD OF THE INVENTION

This invention relates generally to the field of lighting diodes and more specifically to a system and method for testing a lighting diode.

BACKGROUND OF THE INVENTION

Lighting diodes generate light in response to an applied current. Examples of lighting diodes include light-emitting diodes (LEDs) and laser diodes. Testing lighting diodes may involve applying a current to the diode and then detecting the light generated by the diode. The detected light may be analyzed in order to evaluate the diode.

Testing lighting diodes, however, may have some difficulties. For example, in certain situations, the temperature of the diode may increase, affecting the detected light and the analysis.

SUMMARY OF THE INVENTION

In accordance with the present invention, disadvantages and problems associated with previous techniques for testing lighting diodes may be reduced or eliminated.

According to one embodiment of the present invention, a system for testing a lighting diode includes one or more nozzles, a probe, and a detector, where the lighting diode is operable to emit light in response to a current. The one or more nozzles direct a cooling fluid towards the lighting diode. The probe applies a current to the lighting diode. The detector detects the light emitted by the lighting diode in response to the current.

Certain embodiments of the invention may provide one or more technical advantages. A technical advantage of one embodiment may be that a cooling fluid may be directed towards a lighting diode that is being tested. The cooling fluid may lower the temperature of the diode, which may improve the accuracy of the test. In the embodiment, a detector may detect light emitted by the lighting diode during the test.

Another technical advantage of one embodiment may be that the cooling fluid may be directed towards the light-emitting side of the lighting diode, the side opposite of the light-emitting side, or both sides.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
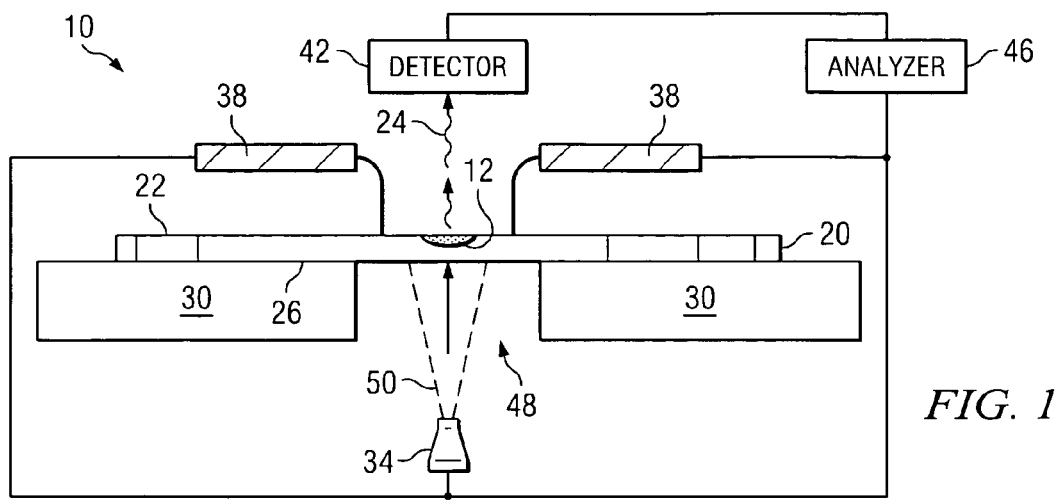
FIG. 1 illustrates one embodiment of a system operable to test a lighting diode of a wafer.
Figure 2:
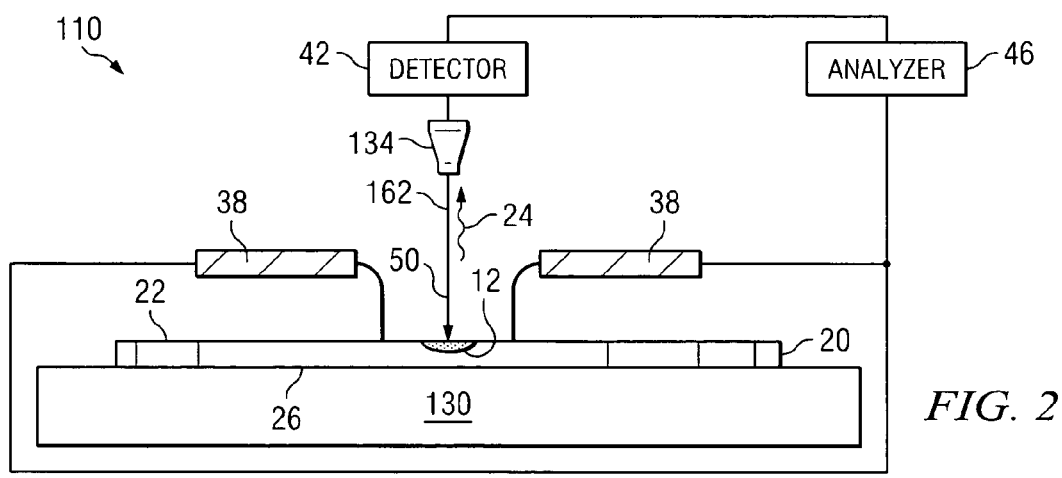
FIG. 2 illustrates another embodiment of a system operable to test a lighting diode of a wafer.
Figure 3:
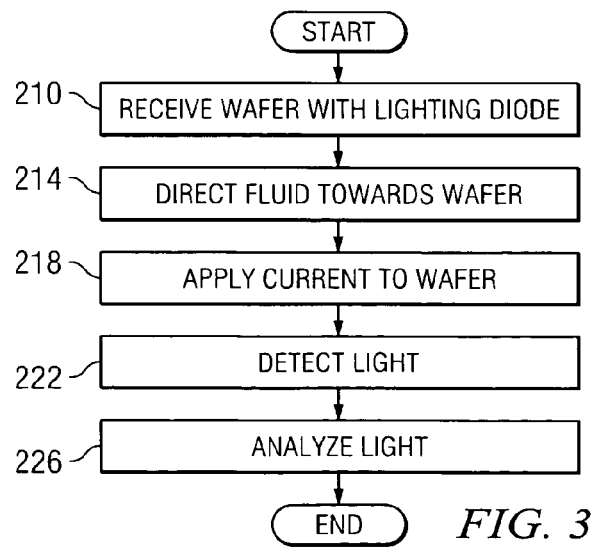
FIG. 3 illustrates one embodiment of a method operable to test a lighting diode that may be used by the system of FIG. 1 or the system of FIG. 2.

Embodiments of the present invention and its advantages are best understood by referring to FIGS. 1 through 3 of the drawings, like numerals being used for like and corresponding parts of the various drawings.

FIG. 1 illustrates one embodiment of a system 10 operable to test a lighting diode 12 of a wafer 20. According to the embodiment, system 10 may direct a cooling fluid towards lighting diode 12 that is being tested. The cooling fluid may lower the temperature of lighting diode 12, which may improve the accuracy of the test. A detector may detect light emitted by lighting diode 12 during the test. In certain embodiments, the cooling fluid may be directed towards the light-emitting side of lighting diode 12, the side opposite of the light-emitting side, or both sides.

In the illustrated embodiment, system 10 may test lighting diode 12 of a wafer 20. Wafer 20 may represent a sawn or unsawn wafer of any suitable material, such as silicon, gallium arsenide (GaAs), and/or other suitable semiconductor material (such as AlGaAs, AlGaP, AlGaInP, GaAsP, GaP, GaN, InGaN, SiC, $Al_2O_3$, ZnSe, C, AlN, AlGaN). Wafer 20 may comprise lighting diode 12. A lighting diode may refer to a semiconductor diode that comprises semiconducting material that releases energy in the form of photons. Examples of lighting diodes include light-emitting diodes (LEDs) and laser diodes.

Wafer 20 may have any suitable size and shape. According to one embodiment, wafer 20 may have a disc shape with two substantially circular sides. A first side 22 may emit light 24 when a current is applied to wafer 20. A second side 26 may be opposite light-emitting side 22.

Light 24 has particular features. Examples of light features include uniformity, intensity, light frequency, and/or optical noise. Lighting diode 12 may have expected values for light features of light 24 emitted by diode 12. For example, lighting diode 12 may have expected values for uniformity, intensity, light frequency, and/or optical noise.

According to the illustrated embodiment, system 10 includes a platform 30, one or more nozzles 34, one or more probes 38, a detector 42, and an analyzer 46 coupled as shown. Platform 30 supports wafer 20 during testing of wafer 20. Light-emitting side 22 of wafer 20 may be placed towards detector 42, and side 26 opposite light-emitting side 22 may be placed towards platform 30.

Platform 30 may comprise any suitable material of any suitable size and shape operable to support wafer 20. Platform 30 may comprise a disc-shaped object that may be slightly larger than wafer 20. In the illustrated embodiment, platform 30 may have a substantially annular shape with an aperture 48 that forms a conduit that allows fluid from nozzle 34 to reach side 26 of wafer 20.

Nozzle 34 directs cooling fluid 50 towards wafer 20 or any suitable portion of wafer 20. According to the illustrated embodiment, nozzle 34 directs cooling fluid 50 through aperture 48 of platform 30 towards side 26 of wafer 20. Nozzle 34 may direct cooling fluid 50 that is under sufficient pressure to reach wafer 20. For example, nozzle 34 may direct cooling fluid 50 under a pressure of 20 to 200 psi.

Cooling fluid 50 may comprise any suitable fluid operable to decrease the temperature of wafer 20 by transferring heat away from wafer 20. The heat transfer may be enhanced by local boiling. Examples of cooling fluid 20 may include deionized and/or distilled water. In one embodiment, cooling fluid 50 may be non-conductive.

Probes 38 apply an electrical current to wafer 20 in order to cause wafer 20 to emit light 24. Probes 38 may comprise, for example, metal fibers such as wires.

Detector 42 detects light 24 emitted from wafer 20 and generates a detector signal representing light 24. Detector 42 may comprise any suitable device operable to detect light 24. For example, detector 42 may comprise a photodiode 12 operable to detect light 24 and generate an electrical signal in response to light 24.

Analyzer 46 directs the operation of system 10. According to one embodiment, analyzer 46 may provide instructions to have nozzle 34 direct cooling fluid 50 towards wafer 20, probes 38 apply a current to wafer 20, and/or detector 42 detect light 24 emitted by wafer 20.

Analyzer 46 may also analyze one or more features of light 24. In one embodiment, analyzer 46 may determine detected values of the features of detected light 24 from a detector signal from detector 42. Analyzer 46 may then compare the detected values with the expected values to evaluate wafer 20. Lighting diode 12 with detected values that at least satisfy or even exceed the expected values may be given a better evaluation than one that does not have such detected values.

Analyzer 46 may be executed by a computing system. A computing system may include input devices, output devices, mass storage media, processors, memory, or other components for receiving, processing, storing, and communicating information. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Modifications, additions, or omissions may be made to system 10 without departing from the scope of the invention. The components system 10 may be integrated or separated according to particular needs. Moreover, the operations of system 10 may be performed by more, fewer, or other components. For example, the operations of analyzer 46 may be performed by more than one component. As used in this document, "each" may refer to each member of a set or each member of a subset of the set.

FIG. 2 illustrates another embodiment of a system 10 operable to test a lighting diode 12 of a wafer 20. According to the illustrated embodiment, system 110 includes a platform 130, one or more nozzles 134, one or more probes 38, detector 42, and analyzer 46 coupled as shown. Platform 130 supports wafer 20. According to the illustrated embodiment, platform 130 may comprise a disc that may be larger in circumference than the circumference of wafer 20.

Nozzle 134 may direct fluid 50 towards light-emitting side 22 of wafer 20. In one embodiment, nozzle 134 may direct fluid 50 towards light-emitting side 22 of wafer 20 using pressure and gravity. Fluid 50 may then receive light 24 generated by light-emitting side 22 and direct light 24 towards detector 42. Fluid 50 may guide light by total internal reflection between fluid 50 and the surrounding air.

In another embodiment, nozzle 134 may direct fluid down a fiber 162. Fiber 162 may comprise, for example, an optical fiber. An optical fiber may comprise glass and/or plastic and may guide light along its length by total internal reflection. Fiber 162 may then receive light 24 generated by light-emitting side 22 and direct light 24 towards detector 42.

Probes 38, detector 42, and analyzer 46 may be as described with reference to FIG. 1.

Modifications, additions, or omissions may be made to system 110 without departing from the scope of the invention. The components system 110 may be integrated or separated according to particular needs. Moreover, the operations of system 110 may be performed by more, fewer, or other components.

FIG. 3 illustrates one embodiment of a method operable to test a lighting diode 12 that may be used by system 10 of FIG. 1 or system 110 of FIG. 2.

The method starts at step 210, where a platform 30 or 130 receives wafer 20 that comprises lighting diode 12. One or more nozzles 34 and/or 134 direct cooling fluid 50 towards wafer 20 at step 214. Cooling fluid 50 may be directed towards light-emitting side 22 and/or side 26 opposite light-emitting side 22.

Probes 38 apply a current to wafer 20 at step 218. In response to the current, lighting diode 12 of wafer 20 emits light 24. Light 24 may be directed towards detector 42 or may travel through fluid 50 or fiber 162 towards detector 42. Detector detects light 24 at step 222. Detector 42 generates a detector signal representing the detected light 24. Analyzer 46 analyzes the light according to the detected signal at step 226. After analyzing the light, the method ends.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that cooling fluid 50 may be directed towards lighting diode 12 that is being tested. Cooling fluid 50 may lower the temperature of diode 12, which may improve the accuracy of the test. In the embodiment, detector 42 may detect light 24 emitted by lighting diode 12 during the test.

Another technical advantage of one embodiment may be that cooling fluid 50 may be directed towards light-emitting side 22 of lighting diode 12, side 26 opposite of light-emitting side 22, or both sides.

Although an embodiment of the invention and its advantages are described in detail, a person skilled in the art could make various alterations, additions, and omissions without departing from the spirit and scope of the present invention as defined by the appended claims.

What is claimed is:

1. A system for testing a lighting diode, comprising:
   one or more nozzles operable to direct a cooling fluid towards a lighting diode, the lighting diode operable to emit light in response to a current;
   a probe operable to apply a current to the lighting diode; and
   a detector operable to detect the light emitted by the lighting diode in response to the current.

2. The system of claim 1, further comprising an analyzer operable to:
   receive a detector signal generated by the detector in response to detecting the light; and
   evaluate the lighting diode according to the detector signal.

3. The system of claim 1, wherein:
   the lighting diode comprises a light-emitting side operable to emit the light; and
   the one or more nozzles are operable to direct the cooling fluid towards the light-emitting side.

4. The system of claim 1, wherein:
   the lighting diode comprises:
      a light-emitting side operable to emit the light; and
      a side opposite of the light-emitting side; and
   the one or more nozzles are operable to direct the cooling fluid towards the side opposite of the light-emitting side.

5. The system of claim 1, wherein:
the lighting diode comprises:
   a light-emitting side operable to emit the light; and
   a side opposite of the light-emitting side; and
the one or more nozzles are operable to direct the cooling fluid towards:
   the light-emitting side; and
   the side opposite of the light-emitting side.

6. The system of claim 1, wherein the cooling fluid is operable to:
direct the light from the lighting diode towards the detector.

7. The system of claim 1, further comprising an optical fiber operable to:
   direct the cooling fluid from at least one nozzle of the one or more nozzles towards the lighting diode; and
   direct the light from the lighting diode towards the detector.

8. The system of claim 1, further comprising a platform operable to support a wafer comprising a lighting diode, the platform having a substantially annular shape with an aperture through which the cooling fluid can pass.

9. The system of claim 1, further comprising a platform operable to support a wafer comprising a lighting diode, the platform having a substantially disk shape.

10. A method for testing a lighting diode, comprising:
directing a cooling fluid towards a lighting diode using one or more nozzles, the lighting diode operable to emit light in response to a current;
applying a current to the lighting diode; and
detecting the light emitted by the lighting diode in response to the current.

11. The method of claim 10, further comprising:
receiving a detector signal generated in response to detecting the light; and
evaluating the lighting diode according to the detector signal.

12. The method of claim 10, wherein:
the lighting diode comprises a light-emitting side operable to emit the light; and
directing the cooling fluid towards the lighting diode further comprises:
   directing the cooling fluid towards the light-emitting side.

13. The method of claim 10, wherein:
the lighting diode comprises:
   a light-emitting side operable to emit the light; and
   a side opposite of the light-emitting side; and
directing the cooling fluid towards the lighting diode further comprises:
   directing the cooling fluid towards the side opposite of the light-emitting side.

14. The method of claim 10, wherein:
the lighting diode comprises:
   a light-emitting side operable to emit the light; and
   a side opposite of the light-emitting side; and
directing the cooling fluid towards the lighting diode further comprises:
   directing the cooling fluid towards:
      the light-emitting side; and
      the side opposite of the light-emitting side.

15. The method of claim 10, further comprising:
directing the light from the lighting diode along cooling fluid towards the detector.

16. The method of claim 10, further comprising:
directing the cooling fluid from at least one nozzle of the one or more nozzles along an optical fiber towards the lighting diode; and
directing the light from the lighting diode along the optical fiber towards the detector.

17. The method of claim 10, further comprising:
supporting a wafer comprising the lighting diode using a platform having a substantially annular shape with an aperture through which the cooling fluid can pass.

18. The method of claim 10, further comprising:
supporting a wafer comprising a lighting diode using a platform having a substantially disk shape.

19. A system for testing a lighting diode, comprising:
means for directing a cooling fluid towards a lighting diode using one or more nozzles, the lighting diode operable to emit light in response to a current;
means for applying a current to the lighting diode; and
means for detecting the light emitted by the lighting diode in response to the current.

20. A system for testing a lighting diode, comprising:
a platform operable to support a wafer comprising a lighting diode, the lighting diode operable to emit light in response to a current, the platform having a substantially annular shape with an aperture through which a cooling fluid can pass, the lighting diode comprising:
   a light-emitting side operable to emit the light; and
   a side opposite of the light-emitting side;
one or more nozzles operable to direct the cooling fluid towards the lighting diode, the one or more nozzles are operable to direct the cooling fluid towards:
   the light-emitting side; and
   the side opposite of the light-emitting side;
a probe operable to apply a current to the lighting diode;
a detector operable to detect the light emitted by the lighting diode in response to the current;
an optical fiber operable to:
   direct the cooling fluid from at least one nozzle of the one or more nozzles towards the lighting diode; and
   direct the light from the lighting diode towards the detector; and
an analyzer operable to:
   receive a detector signal generated by the detector in response to detecting the light; and
   evaluating the lighting diode according to the detector signal.

* * * * *